Nov. 28, 1961   D. T. JONES   3,011,146
SEISMIC SIGNAL INTERPRETATION APPARATUS
Filed Jan. 27, 1958   4 Sheets-Sheet 1

INVENTOR.
D. T. JONES
BY *Hudson & Young*
ATTORNEYS

Nov. 28, 1961     D. T. JONES     3,011,146
SEISMIC SIGNAL INTERPRETATION APPARATUS
Filed Jan. 27, 1958     4 Sheets-Sheet 2

INVENTOR.
D.T. JONES
BY Hudson & Young
ATTORNEYS

Nov. 28, 1961  D. T. JONES  3,011,146
SEISMIC SIGNAL INTERPRETATION APPARATUS
Filed Jan. 27, 1958  4 Sheets-Sheet 3

INVENTOR.
D.T. JONES
BY *Hudson & Young*
ATTORNEYS

Nov. 28, 1961   D. T. JONES   3,011,146
SEISMIC SIGNAL INTERPRETATION APPARATUS
Filed Jan. 27, 1958   4 Sheets-Sheet 4

INVENTOR.
D. T. JONES
BY Hudson & Young
ATTORNEYS

United States Patent Office 3,011,146
Patented Nov. 28, 1961

3,011,146
SEISMIC SIGNAL INTERPRETATION
APPARATUS
Donald T. Jones, Idaho Falls, Idaho, assignor to Phillips Petroleum Company, a corporation of Delaware
Filed Jan. 27, 1958, Ser. No. 711,494
15 Claims. (Cl. 340—15)

This invention relates to the interpretation of seismic records.

Seismic exploration refers to a method of obtaining information regarding subterranean earth formations by transmitting vibrations from a first point at or near the surface of the earth downwardly into the formations and measuring the reflected vibrations at one or more second points spaced from the first point. It is common practice to detonate an explosive charge to produce the vibrations. A plurality of vibration responsive seismometers are disposed in a predetermined geometric array in spaced relationship from the shot hole. The vibrations incident upon the seismometers are converted into corresponding electrical signals which are amplified and recorded. By measuring the travel times of selected vibrations, valuable information can be obtained regarding the depth and slope of subterranean reflecting formations. Unfortunately, extraneous vibrations normally are present which tend to obscure the desired reflected signals. In order to minimize the effect of these extraneous vibrations, a number of systems have been proposed which include electrical filter networks and selected spacings of the seismometers. However, it still is impossible to obtain accurate seismic information in many areas of the country.

It has been proposed to combine a plurality of seismic signals from a common shot point so that reflections from a given bed are added. This procedure enables the reflections to be more readily identified because extraneous noise vibrations received at different seismometers tend to occur at random phases and cancel one another to some extent. However, the addition of seismic records from a plurality of locations is complicated by the fact that the reflected vibrations travel different distances to the spaced seismometers. The reflected vibrations thus appear at different points on the record. This displacement is commonly referred to as "step out" and is caused by both the difference in paths of the reflected vibrations and differences in velocity of travel at various depths. In general, seismic signals travel at higher velocities at lower depths in the earth. In order to add a plurality of seismic signals so that common reflections are superimposed, it becomes necessary to displace the records by different amounts to compensate for reflections from beds at different levels.

In accordance with the present invention, novel apparatus is provided for displacing and superimposing a plurality of seismic signals so that reflections from common beds are superimposed. The measured vibrations are recorded on a medium such as a magnetic tape. The recorded signals from individual seismometers are subsequently re-recorded on a second tape after being delayed a predetermined amount which compensates for angularity of path of the reflected vibrations. The apparatus of this invention is capable of compensating for differences in seismometer locations and differences in travel velocities. In one specific embodiment of this invention the original seismometer signals are recorded on a first magnetic tape, then re-recorded on a second magnetic tape, and finally are combined and recorded on a third magnetic tape. The travel distance of the second tape between the recording and reproducing head is varied continuously to compensate for the angularity of path. In another embodiment, the positions of the reproducing heads are varied continuously.

Accordingly, it is an object of this invention to provide improved apparatus for interpreting seismic signals.

Another object is to provide apparatus to reproduce seismic signals with a predetermined amount of delay.

A further object is to provide apparatus for combining and reproducing seismic records in such a manner that reflections from common subterranean formations are added algebraically.

Other objects, advantages and features of this invention should become apparent from the following detailed description, taken in conjunction with the accompanying drawing in which.

Figure 1:
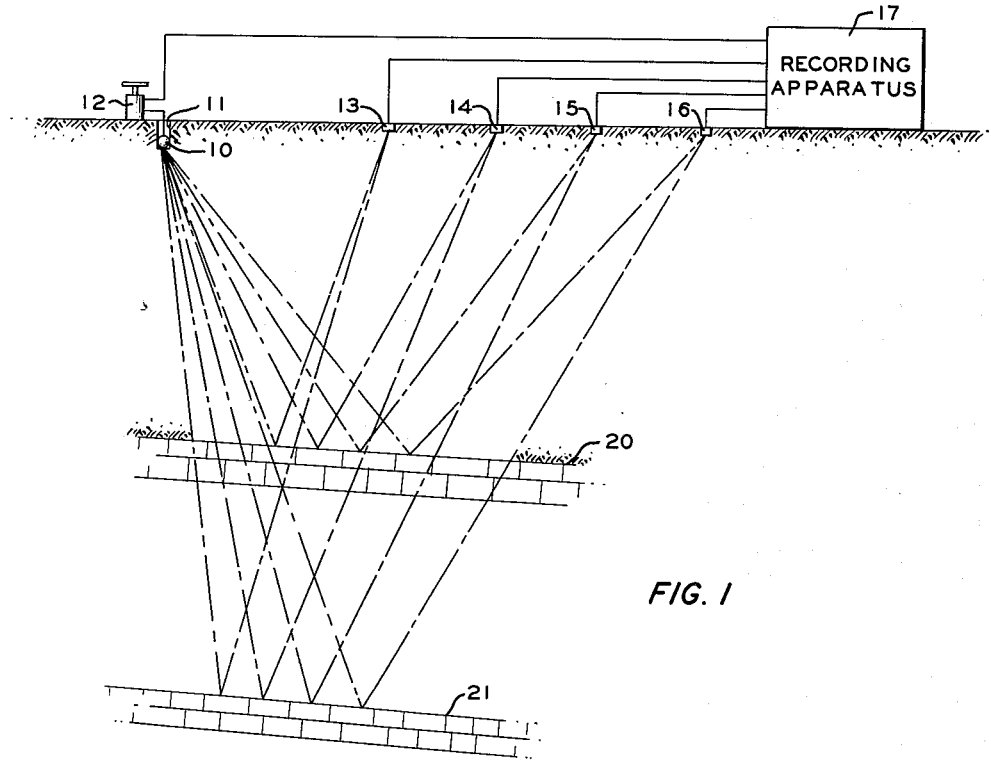
FIGURE 1 is a schematic representation of a typical seismic exploration system.

Referring now to the drawing in detail, and to FIGURE 1 in particular, there is shown a schematic representation of apparatus commonly employed in seismic exploration. Vibrations are established at a first point near the surface of the earth by detonating an explosive charge 10 in a shot hole 11. This is accomplished by means of a detonator 12 at the surface. A plurality of seismometers 13, 14, 15 and 16 are positioned near the surface in spaced relationship with shot hole 11. These seismometers can represent individual vibration responsive transducing elements, or they can represent a plurality of such elements grouped together, as is conventional in the seismic exploration art. These seismometers are of the type which convert mechanical vibrations incident thereon into corresponding electrical signals. These signals are amplified and recorded by apparatus 17, which can be a conventional magnetic recorder, for example. Vibrations emitted from explosive charge 10 travel downwardly into the earth and are reflected from subterranean formations such as indicated at 20 and 21. The vibrations reflected from these formations are received by the seismometers at the surface. Detonator 12 also generates an electrical pulse which is applied directly to apparatus 17 to indicate on the records the time the shot is detonated.

Figure 2:
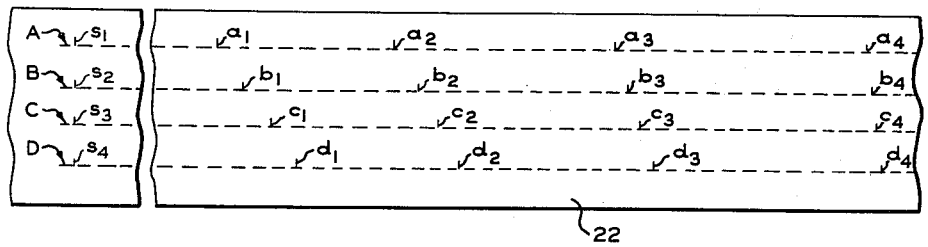
FIGURE 2 is a schematic representation of a typical magnetic recording produced by the recording apparatus of FIGURE 1.

FIGURE 2 is a schematic representation of the recorded signal produced by apparatus 17. The vibrations received by seismometers 13, 14, 15 and 16 are represented schematically by respective channels A, B, C and D of magnetic tape 22. The points $s_1$, $s_2$, $s_3$, and $s_4$ represent the time of detonation of charge 10. Points $a_1$ and $a_2$ on trace A represent reflections from respective formations 20 and 21. Points $a_3$ and $a_4$ represent reflections from lower beds, not shown in FIGURE 1. In similar manner, the $b$, $c$ and $d$ points on the tape represent reflections received by respective seismometers 14, 15 and 16. From an inspection of FIGURES 1 and 2 it should be evident that the first reflection received by seismometer 13 arrives at a time earlier than does the first reflection received by seismometer 14. This is because the vibrations received by seismometer 14 travel a greater distance than the vibrations received by seismometer 13. However, this difference in travel time becomes progressively smaller as vibrations are received from greater depths because the differences in travel distances become progressively smaller. In order to identify the various reflections in the presence of random noise vibrations, it is proposed that the several traces A, B, C and D be superimposed in a manner so that the individual reflections are added, whereas random noise vibrations tend to cancel one another.

Figure 3:
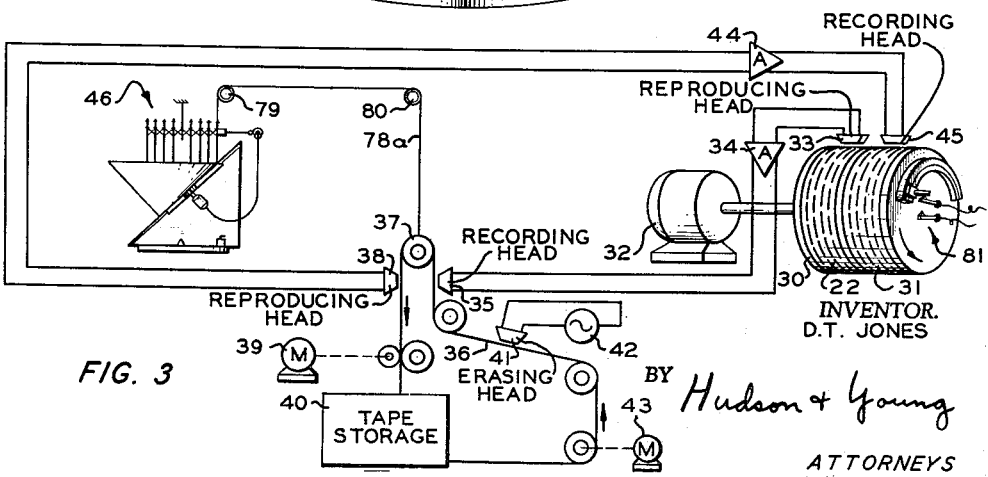
FIGURE 3 is a schematic representation of the signal transforming apparatus of this invention.

Referring now to FIGURE 3, there is shown a drum 30 which has a tape 22 mounted thereon. Drum 30 also has a second multi-channel tape 31 mounted thereon. Drum 30 is rotated at a constant speed by a synchronous motor 32. A reproducing head 33 is adapted to be positioned adjacent any one of the traces on tape 22. Reproducing head 33 is connected through an amplifier 34 to a recording head 35 which is mounted adjacent a magnetic tape 36. Tape 36 passes from recording head 35 over an adjustable pulley 37, past a reproducing head 38 and into a storage box 40. Tape 36 is driven past recording head 35 at a constant speed by means of a motor 43. A low-inertia, constant-torque motor 39 pulls tape 36 from pulley 37 and returns same to box 40. The tape is subsequently removed from storage box 40 and passes adjacent an erasing head 41 back past recording head 35. Erasing head 41 can be connected to a source of high frequency alternating current 42 which removes the signal previously recorded on the tape. Reproducing head 38 is connected through an amplifier 44 to a recording head 45 which is adapted to be positioned adjacent any selected channel on magnetic tape 31. Pulley 37 is adapted to be moved upwardly by time delay apparatus 46 so as to vary the travel path of tape 36 between recording head 35 and reproducing head 38. This movement of pulley 37 controls the amount of delay between the time a signal is reproduced from tape 22 and is recorded on tape 31. Each individual channel of tape 22 is re-recorded on a separate channel of tape 31 by incorporating a proper amount of delay so that reflections from the reflecting beds such as 20 and 21 are recorded side by side on tape 31 in the several records.

Figure 4:
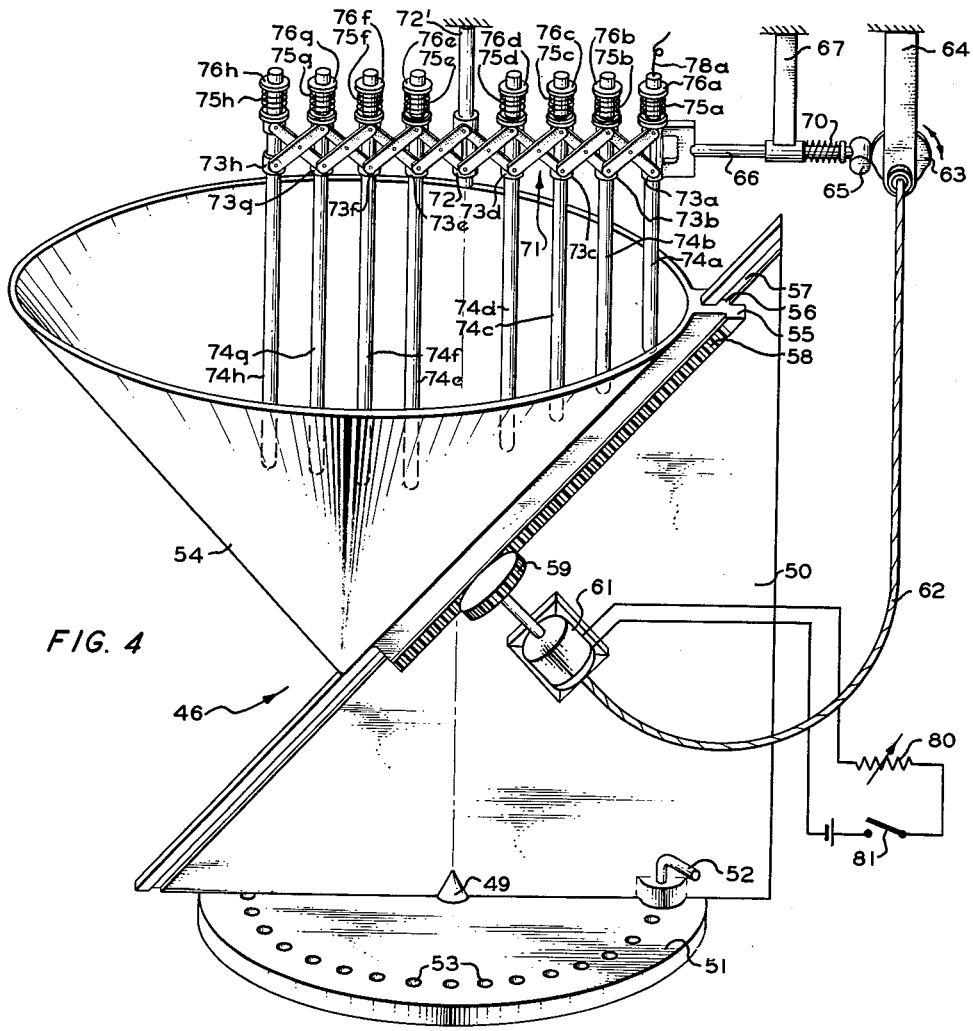
FIGURE 4 is a detailed schematic view of the time delay apparatus of FIGURE 3.

Delay apparatus 46 is illustrated in detail in FIGURE 4. A triangular support plate 50 is pivotally mounted on a base 51, and is provided with a rod 52 which selectively engages holes 53 in base 51 to lock the plate in a desired position. A right angle cone 54 is provided with a bifurcated flange 55 that has a key 56 which engages a slot 57 in plate 50 so that cone 54 can move up and down the edge of plate 50. One edge of flange 55 forms a rack 58 which is engaged by a pinion 59. Pinion 59 is rotated by a constant speed motor 61 which is mounted on plate 50. The drive shaft of motor 61 is also connected by a flexible shaft 62 to a cam 63 which is attached to a rigid support 64. Cam 63 pushes against the head 65 of a rod 66 which extends through a support 67. A spring 70 urges head 65 into engagement with cam 63. The second end of rod 66 is attached to one end of a scissors linkage 71, the center of which is attached to a rigid support 72'. A plurality of sleeves 73a, 73b, 73c, 73d, 72, 73e, 73f, 73g and 73h are attached to linkage 71 in spaced relationship with one another. Rods 74a, 74b, 74c, 74d, 74e, 74f, 74g and 74h extend through respective sleeves 73a, 73b, 73c, 73d, 73e, 73f, 73g and 73h downwardly into engagement with the inner surface of cone 54. Tension springs 75a, 75b, 75c, 75d, 75e, 75f, 75g and 75h extend between the linkage disks 76a, 76b, 76c, 76d, 76e, 76f, 76g and 76h which are attached to respective rods 74a, 74b, 74c, 74d, 74e, 74f, 74g, and 74h to urge the rods downwardly. Sleeves 72 and 73a are provided with slots to accommodate expansion and contraction of the linkage.

A cable 78a extends from rod 74a past guide wheels 79 and 80 to pulley 37 of FIGURE 3. Downward movement of rod 74a thus lifts pulley 37 to increase the travel time of tape 36 from recording head 35 to reproducing head 38. There are as many tapes 36 as there are traces to be corrected. Only one such tape assembly has been illustrated in FIGURE 3 to simplify the drawing. Obviously, there can be more rods in the delay apparatus if there are more seismometer receiving units.

Figure 5:
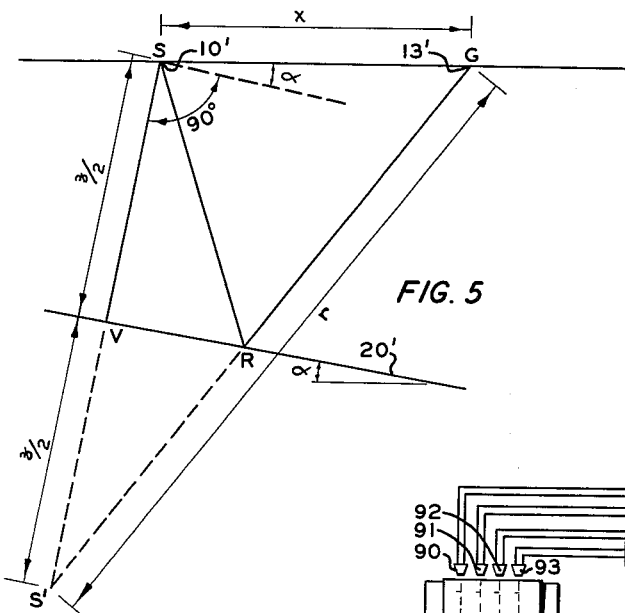
FIGURE 5 is a graphical representation of an operating feature of this invention.
Figure 6:
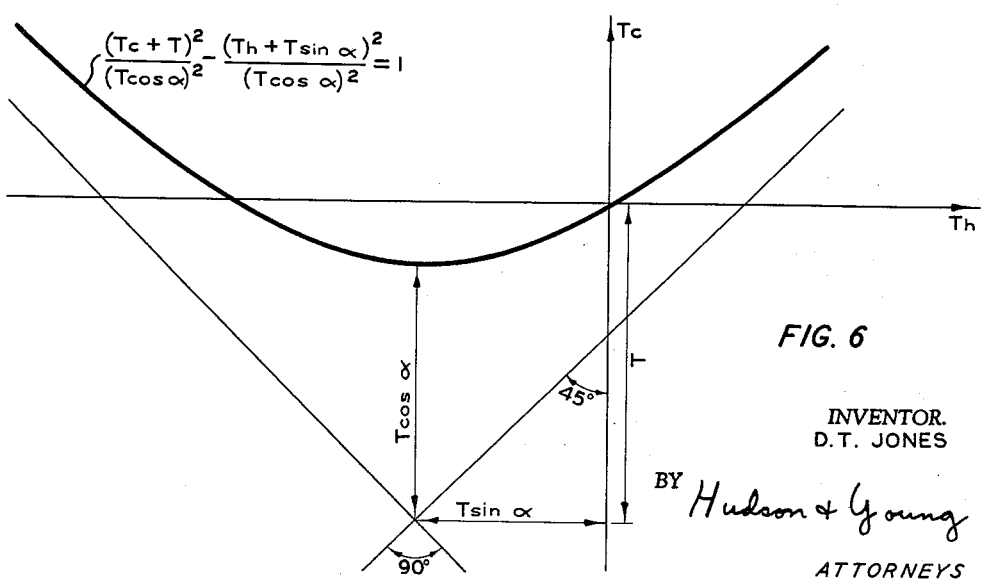
FIGURE 6 is a second graphical representation of an operating feature of this invention.

The operation of the time delay network of FIGURE 4 can be explained in conjunction with FIGURES 5 and 6. FIGURE 5 is a schematic representation of the path of vibrations emitted from point S which are reflected from a bed 20' to a point C. From the law of cosines:

$$Trw^2 = Th^2 + T^2 - 2ThT \cos(90+\alpha) \tag{1}$$

where: $Trw$, the travel time over path SRG or S'RG, is $r/v$, $v$ being the average velocity of the vibrations; $T$ is the travel time over path SVS or SS'; and $Th$ is defined as the quantity $x/v$, a fictitious time. This relationship can also be expressed:

$$r^2 = z^2 + x^2 - 2xz \cos\left(\frac{\pi}{2}+\alpha\right) \tag{2}$$

Dividing by $v^2$, Equation 2 becomes:

$$\left(\frac{r}{v}\right)^2 = \left(\frac{z}{v}\right)^2 + \left(\frac{x}{v}\right)^2 + 2\frac{z}{v}\frac{x}{v}\sin\alpha \tag{3}$$

The angle of dip of the reflecting bed 20' is represented by $\alpha$ in the above equations.

The quantity $Trw$ can be expressed as $T+Tc$, where $Tc$ is a correction by which $T$ is determined from $Trw$, the measured reflection time. Equation 1 can then be modified as follows:

$$\begin{aligned}(T_c+T)^2 &= Th^2+2TTh\sin\alpha+T^2\\ &= Th^2+2TTh\sin\alpha+T^2(\sin^2\alpha+\cos^2\alpha)\\ &= (Th+T\sin\alpha)^2+T^2\cos^2\alpha\end{aligned} \tag{4}$$

This equation is obtained from the relationship $$\sin^2+\cos^2=1$$

Equation 4 can be expressed:

$$\frac{(Tc+T)^2}{(T\cos\alpha)^2} - \frac{(Th+T\sin\alpha)^2}{(T\cos\alpha)^2} = 1 \tag{5}$$

as equilateral hyperbola, when plotted as shown in FIGURE 6.

The hyperbola of FIGURE 6 is represented by the conic section defined by the lower ends of rods 74 of FIGURE 4. The ordinate $Tc$ of FIGURE 6 is a vertical line through the pivot point 49 of plate 50 of FIGURE 4. The abscissa $Th$ is a reference axis through the plane of rods 74. Plate 50 is free to pivot through the angle $\alpha$ about axis $Tc$, the angle $\alpha$ being zero when plate 50 is perpendicular to the axis. Vertical axis $Tc$ also extends through center support 72'. The spacing between adjacent rods on each side of support 72' remains uniform and the rods remain in the plane of the axes $Tc$ and $Th$ when moved by cam 63. The distance of a given rod 74 from support 72' is representative of the distance the corresponding seismometer is from the shot point.

In operation, motor 61 moves cone 54 downwardly along the edge of plate 50 at a constant velocity so that the apex of the inner surface of the cone is always $T\sqrt{2}$ units, measured along the hypotenuse of triangular plate 50, from the intersection of the reference axes. The vertical displacement of this apex from the intersection of the axes is thus $T$ units, and the lateral displacement in the direction of the $Th$ axis is $T\sin\alpha$ units. This conforms to the mathematics discussed above.

In describing the overall operation of the computer of this invention, it will first be assumed that the velocity of the waves through the earth is constant and known. This velocity can often be measured by firing shots in a deep well and measuring travel times to the surface. Rods 74 are displaced manually from support 72' by distances representative of the horizontal spacings of the seismometers from the shot point. Rods 74e, 74f, 74g and 74h correspond to seismometers, not shown in FIGURE 1, which may be on the left side of the shot hole. Since the velocity is assumed to be constant, the connection between motor 61 and cam 63 is removed. Plate 50 is rotated on base 51 to some assumed angle α. Resistor 80 is adjusted so that motor 61 rotates at a velocity representative of the velocity of seismic waves. Motor 32 is energized to rotate drum 30. This rotation closes switch 81, which is the latching type, to energize motor 61 when tape 22 is at the desired location with respect to head 45 to start the record correction. For example, switch 81 can be closed when the first reflection in the original recording is under head 45. As cone 54 moves downwardly, pulley 37 is raised to increase the delay between heads 35 and 38. Each of the records on tape 22' is corrected at the same time.

Figure 7:
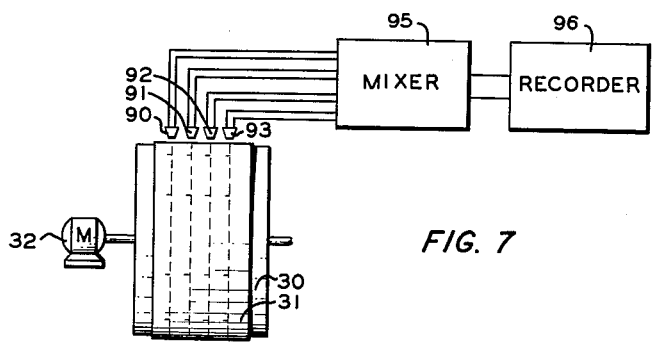
FIGURE 7 is a schematic representation of the signal reproducing system.

If α is chosen correctly, reflections from common beds then appear side by side on tape 31. The records on tape 31 are then reproduced and combined so that the desired reflections are added in phase with one another. It is assumed that the extraneous noise vibrations occur randomly and tend to cancel one another. A suitable reproducing system is illustrated schematically in FIGURE 7. Four reproducing heads 90, 91, 92 and 93 are positioned adjacent the four traces on tape 31. These four reproducing heads are connected to the inputs of a mixer 95, and the output of mixer 95 is connected to the input of a recorder 96. This produces a composite record wherein the amplitudes of the four traces are added.

If α is not chosen correctly, the above procedure is repeated with a new value of α. Once the correct α is found, it is employed to correct records from adjacent shot holes. If it is subsequently discovered that α is no longer correct, a new α must be found to correct for the new dip of the reflecting formations.

As previously discussed, the velocity of the seismic waves often increases at greater depths. The mathematical derivation has assumed an average velocity in computing T$h$. If the velocity increases, the average velocity increases to change T$h$. Cam 63 is provided to correct for this factor. If the actual velocity increase is known, cam 63 is designed to vary the horizontal spacings between rods 74 during the delay operation to compensate for changing velocities. If the velocity increase is not known it can be obtained by a trial and error procedure. The rods are set manually at different spacings to determine the best correction factor at different parts of the record. A suitable cam can then be designed to make such a continuous correction.

Figure 8:
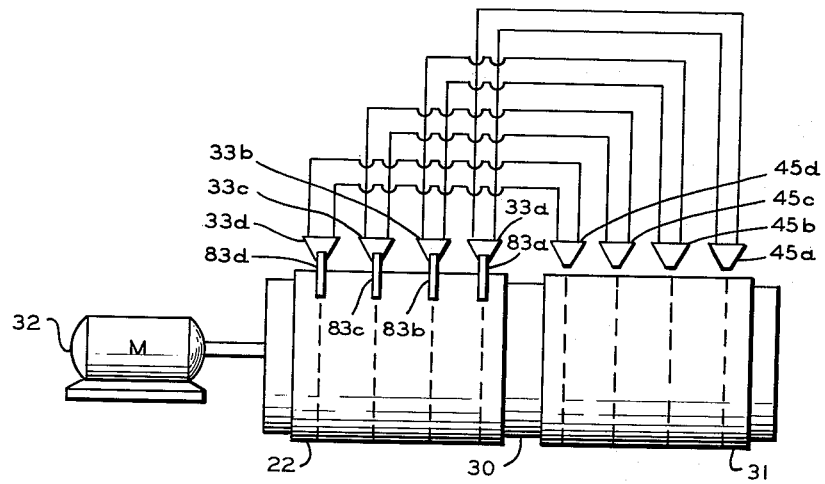
FIGURE 8 is a schematic representation of a second embodiment of the signal transfer apparatus of this invention.
Figure 9:
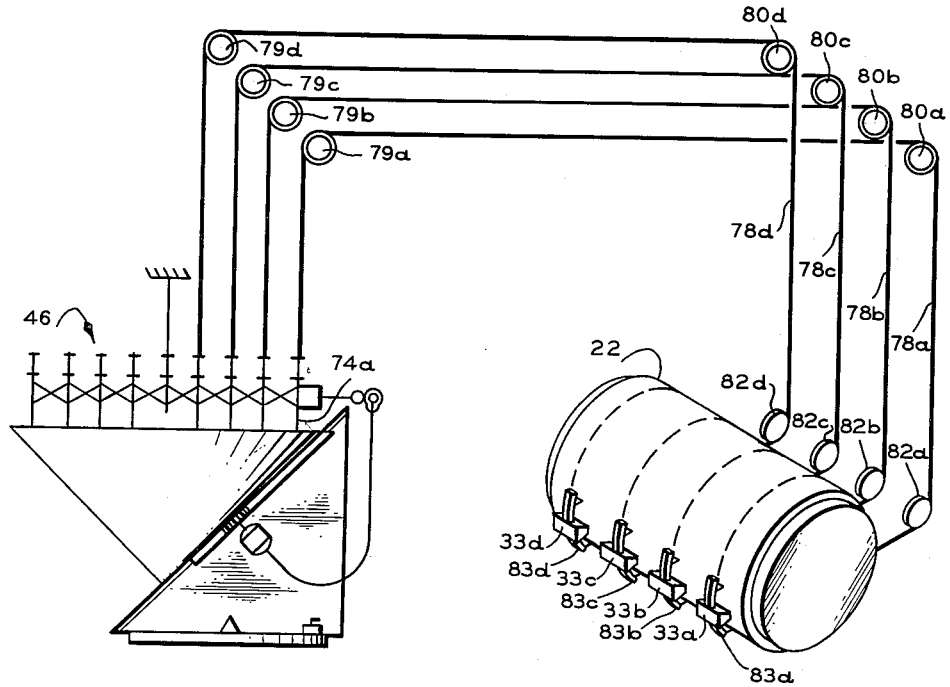
FIGURE 9 shows the reproducing head moving means employed in the apparatus of FIGURE 8.

A second embodiment of the seismic signal reproducing apparatus of this invention is illustrated schematically in FIGURES 8 and 9. A plurality of reproducing heads 33a, 33b, 33c and 33d are mounted adjacent the traces on tape 22. These reducing heads are mounted on respective guides 83a, 83b, 83c and 83d so that the positions of the heads can be adjusted longitudinally of the traces on tape 22. Reproducing heads 33a, 33b, 33c and 33d are connected to respective recording heads 45a, 45b, 45c and 45d which are mounted adjacent tape 31. If desired, amplifying means can be included in these connecting circuits. The positions of the reproducing heads relative to tape 22 are adjusted by delay apparatus 46. Reproducing head 33a, for example, is connected by cable 78a to rod 74a. Cable 78a passes about guide wheels 79a, 80a and 82a so that reproducing head 33a is moved along guide 83a when rod 74a is lowered. The other reproducing heads are similarly connected to corresponding rods of the delay apparatus. In this manner, the time correction is applied directly to the drum repro-ducing heads, rather than through the auxiliary storage tape shown in FIGURE 3.

From the foregoing description it should be evident that there is provided in accordance with this invention novel apparatus for use in evaluating seismic records. This apparatus is capable of determining both the dip of reflecting formations and the velocity of the seismic vibrations.

While the invention has been described in conjunction with present preferred embodiments, it should be evident that it is not limited thereto.

What is claimed is:

1. Apparatus for interpreting seismic signals comprising a recording medium, a recording head and a reproducing head spaced from one another adjacent said recording medium, means to move said recording medium relative to said heads from said recording head to said reproducing head so that said recording medium moves past said recording head at a constant velocity, a right angle cone, a rod mounted parallel to the axis of said cone, means retaining one end of said rod in slidable engagement with the side of said cone, means to move said cone relative to said rod in a direction which makes an angle of 45° with the axis of said cone, means to establish a signal representative of the movement of said rod in the direction of the axis of said cone, and means responsive to said signal to vary the length of said recording medium between said recording and reproducing heads.

2. The apparatus of claim 1 further comprising a second recording medium, means to apply signals recorded on said second recording medium to said recording head, a third recording medium, and means to apply signals established by said reproducing head to said third recording medium.

3. Apparatus for use in interpreting seismic signals comprising a right angle cone, a plurality of rods, means positioning said rods parallel to the axis of said cone and in a common plane, means urging first ends of said rods into slidable engagement with the side of said cone, and means to move said cone relative to said rods and in a direction which makes an angle of 45° with the axis of said cone, said first ends of said rods remaining in engagement with the side of said cone.

4. The apparatus of claim 3 further comprising means to move said rods in said common plane so that the axes thereof remain parallel to the axis of said cone and so that the distances between adjacent rods vary but remain equal.

5. Apparatus for use in interpreting seismic signals comprising a base, a plate supported by and pivotally attached to said base so as to be free to rotate about a first axis which is perpendicular to the plane of said base, said plate having a first edge which makes an angle of 45° with the plane of said base, a hollow right angle cone, means attaching said cone to said first edge of said plate, means to move said cone along said first edge so that the axis of said cone remains perpendicular to the plane of said base, a plurality of rods, means retaining said rods parallel to one another and to said first axis in a common plane which includes said first axis, and means urging first ends of said rods into engagement with the inner surface of said cone.

6. The apparatus of claim 5 wherein said means to move said rods comprises a flexible linkage to retain the distances between adjacent rods equal, and a cam in engagement with said linkage so that rotation of said cam changes the distances between adjacent rods; wherein said means to move said cone comprises a rack attached to said cone, a motor secured to said plate, and a pinion carried by the drive shaft of said motor, said pinion being in engagement with said rack; and means connecting the drive shaft of said motor to said cam to rotate same.

7. The apparatus of claim 5 wherein said means to move said cone comprises a rack attached to said cone, a motor secured to said plate, and a pinion carried by the drive shaft of said motor, said pinion being in engagement with said rack.

8. The apparatus of claim 5 further comprising means to rotate said cone about an axis parallel to the axis of said cone and which is in said common plane.

9. The apparatus of claim 5 further comprising means to move said rods in said common plane away from said first axis so that the distances between adjacent rods remain equal and the axes of said rods remain parallel to said first axis.

10. Apparatus for interpreting seismic signals comprising a plurality of recording mediums, a recording head and a reproducing head spaced from one another adjacent each of said recording mediums, means to move each of said recording mediums relative to the associated heads from the associated recording head to the associated reproducing head and at a constant velocity past the recording heads, a base, a plate supported by and pivotally attached to said base so as to be free to rotate about a first axis which is perpendicular to the plane of said base, said plate having a first edge which makes an angle of 45° with the plane of said base, a hollow right angle cone, means attaching said cone to said first edge of said plate, means to move said cone along said first edge so that the axis of said cone remains perpendicular to the plane of said base, a plurality of rods, means retaining said rods parallel to one another and to said first axis in a common plane which includes said first axis, means urging first ends of said rods into engagement with the inner surface of said cone, and means responsive to movements of said rods to vary the lengths of said recording mediums between associated ones of said recording and reproducing heads.

11. Apparatus for interpreting seismic signals comprising a recording medium, a recording head and a reproducing head spaced from one another adjacent said recording medium, means to move said recording medium relative to said heads from said recording head to said reproducing head so that said recording medium moves past said recording head at a constant velocity, a support having the configuration of an equilateral hyperbola, a rod supported by said support, means retaining said rod in a position so that the axis thereof makes an angle of 45° with one of the axes of said hyperbola and so that said rod is free to move in the direction of its axis, means to move said support in the direction of said one axis, and means responsive to movement of said rod in the direction of its axis to vary the length of said recording medium between said recording and reproducing heads.

12. The apparatus of claim 11 further comprising means to move said rod in the plane of said support in a direction perpendicular to the axis of said rod.

13. The apparatus of claim 11 further comprising a second recording medium, means to apply signals recorded on said second recording medium to said recording head, a third recording medium, and means to apply signals established by said reproducing head to said third recording medium.

14. Apparatus for interpreting seismic signals comprising a recording medium, a reproducing head, means positioning said reproducing head adjacent said recording medium, means to move said recording medium relative to said reproducing head, a right angle cone, a rod mounted parallel to the axis of said cone, means retaining one end of said rod in slidable engagement with the side of said cone, means to move said cone relative to said rod in a direction which makes an angle of 45° with the axis of said cone, means to establish a signal representative of the movement of said rod in the direction of the axis of said cone, means responsive to said signal to adjust the position of said reproducing head relative to said recording medium, and means to record the output signal of said reproducing head.

15. Apparatus for interpreting seismic signals comprising a recording medium, a plurality of reproducing heads, means adjustably positioning each of said reproducing heads adjacent one another and adjacent said recording medium, means to move said recording medium relative to each of said reproducing heads, a base, a plate supported by and pivotally attached to said base so as to be free to rotate about a first axis which is perpendicular to the plane of said base, said plate having a first edge which makes an angle of 45° with the plane of said base, a hollow right angle cone, means attaching said cone to said first edge of said plate, means to move said cone along said first edge so that the axis of said cone remains perpendicular to the plane of said base, a plurality of rods, means retaining said rods parallel to one another and to said first axis in a common plane which includes said first axis, means urging first ends of said rods into engagement with the inner surface of said cone, means responsive to movements of said rods to vary the positions of respective ones of said reproducing heads relative to said recording medium, and means to record the output signals of said reproducing heads.

References Cited in the file of this patent
UNITED STATES PATENTS

| | | |
|---|---|---|
| 2,765,455 | Meiners | Oct. 2, 1956 |
| 2,887,890 | Schardt | May 26, 1959 |